United States Patent
Buchsbaum et al.

(10) Patent No.: US 7,161,934 B2
(45) Date of Patent: Jan. 9, 2007

(54) SATELLITE BASED CONTENT DISTRIBUTION SYSTEM USING IP MULTICAST TECHNOLOGY

(75) Inventors: Luiz Buchsbaum, Great Falls, VA (US); Tokuo Oishi, Vienna, VA (US); Shailesh Jhugroo, Washington, DC (US)

(73) Assignee: Intelsat, Washington, DC (US)

( * ) Notice: Subject to any disclaimer, the term of this patent is extended or adjusted under 35 U.S.C. 154(b) by 898 days.

(21) Appl. No.: 09/813,144

(22) Filed: Mar. 21, 2001

(65) Prior Publication Data

US 2002/0136201 A1 Sep. 26, 2002

(51) Int. Cl.
*H04L 12/66* (2006.01)
*H04H 1/08* (2006.01)

(52) U.S. Cl. .................. 370/382; 370/312; 370/487; 709/203

(58) Field of Classification Search ................ 370/352, 370/355, 356, 289, 312, 315, 327–329, 338, 370/349, 357, 401, 406, 465, 487, 389; 709/202–204; 455/12.1, 13.2, 13.1
See application file for complete search history.

(56) References Cited

U.S. PATENT DOCUMENTS

| | | | | |
|---|---|---|---|---|
| 6,389,453 B1 * | 5/2002 | Willis | .......................... | 709/204 |
| 6,441,782 B1 * | 8/2002 | Kelly et al. | .................. | 342/359 |
| 6,501,423 B1 * | 12/2002 | Kelly et al. | .................. | 342/359 |
| 6,519,243 B1 * | 2/2003 | Nonaka et al. | ............. | 370/338 |
| 6,650,869 B1 * | 11/2003 | Kelly et al. | ................ | 455/13.2 |

* cited by examiner

*Primary Examiner*—Doris H. To
*Assistant Examiner*—Saba Tsegaye
(74) *Attorney, Agent, or Firm*—Sughrue Mion, PLLC

(57) ABSTRACT

A method and system of performing IP multicast includes a client at one of many downstream networks that sends a request signal to an upstream network via a return channel (e.g., the Internet), and the upstream network sends the request to a media server. The media server, and for live data, a media encoder, processes a media stream to generate a real-time IP multicast communication that is output to a unidirectional satellite that transmits the IP multicast communication to the client without delay via the downstream network, and can convert the IP multicast to unicast. The bidirectional return channel allows the source to calculate billing information based on client usage statistics, and transmits confirmation acknowledgement based on a confirmation request from the upstream network. Because the routing configuration is transparent to the rest of the network, the invention applies to multi-hop networks on both sides of the satellite link.

19 Claims, 2 Drawing Sheets

SATELLITE BASED CONTENT DISTRIBUTION SYSTEM USING IP MULTICAST TECHNOLOGY

BACKGROUND OF THE INVENTION

1. Field of the Invention

The present invention relates to a method and system for distributing content via Internet Protocol (IP) multicast technology, and more specifically, to a method and system that includes unidirectional communication via satellite and use of a return channel to request distribution of content.

2. Background of the Prior Art

In the current prior art networks, the bulk of traffic is transmitted in unicast form, which requires a separate copy of data to be sent from a source to each requesting client. However, the prior art unicast technology has various problems and disadvantages. For example, because separate copies must be sent for each requesting client throughout the system, a significant quantity of bandwidth is required and available bandwidth is reduced, thus reducing overall system speed and efficiency.

To overcome some of the problems and disadvantages of the prior art unicast network, a prior art multicast technology has been developed. Multicast technology allows a single copy of data to be sent throughout the network to requesting clients, and increases efficiency with bandwidth-hungry Internet applications such as streaming media. Multicast is considered a point-to-multipoint data distribution technology.

In the prior art, satellites operate in a broadcast mode. For example but not by way of limitation, a signal can be up-linked and down-linked to different receivers located within the satellite's footprint (i.e., area of potential broadcast coverage). With respect to Internet communication, prior art satellites have been used to provide bi-directional links between source and destination nodes. As a result, the satellite must be involved in both the transmission as well as the reception for both sides of the satellite link, and the prior art satellite for Internet communication is considered bidirectional. Accordingly, signal transmission to satellites is relatively costly with respect to reception due to the cost of reception and transmission in both directions.

However, the prior art bidirectional satellite has various problems and disadvantages. For example but not by way of limitation, because transmission is so much more costly from a bandwidth perspective than reception, the efficiency of the satellite is reduced.

As a result, a prior art method of IP multicast over unidirectional satellite link has been developed. In the prior art unidirectional IP multicast method, content is transmitted from a source to multiple destinations in a broadcast mode, including multicast file transfer software and extra storage devices at the destination nodes. Prescribed data is transmitted at a predetermined time from a server (i.e., source) to various different locations over the footprint of satellites in a satellite network. The various different locations receive and store the prescribed data for distribution over the network.

The prior art unidirectional IP multicast system operates based on a unicast routing table and conversion system. Because so much of the Internet is still only configured for unicast communication, multicast communication must be converted. In the prior art, multicast-enabled routers use information stored in the unicast routing tables to convert and distribute IP multicast data. A prior art algorithm known as Reverse Path Forwarding (RPF) is used in conjunction with the unicast routing tables to build multicast trees for data distribution throughout the network. However, in the prior art unidirectional routing system, IP multicast fails to properly operate, because the request is always transmitted on a different interface from the interface that receives multicast traffic, as the destination cannot communicate with the source in a unidirectional IP multicast system that uses satellite transmission. The prior art one-way communication prevents selective IP multicast transmission. Another prior art approach requires a "hard join" where the server is forced to transmit data over a unidirectional link without a request.

However, the prior art IP multicast system with unidirectional broadcasting has additional problems and disadvantages. For example, because the prior art system loads traffic in a broadcast mode, all destinations receive the traffic, regardless of whether the destinations have the IP multicast traffic. Thus, there is a substantial waste of bandwidth because the prior art lacks requesting capability in a unidirectional IP multicast system.

Additionally, the prior art system cannot deliver real-time (i.e., live) data (e.g., streaming), because once the data has been distributed, it is first transmitted to storage devices for redistribution prior to being received by the client. Thus, a time delay exists in the prior art system such that live data cannot be IP multicast via unidirectional satellite.

Further, the prior art system cannot distribute content to a multi-hops network in a single execution-cycle. Instead, the prior art system must use re-distribution from the local storage devices at the destination node to distribute content over a multi-hops terrestrial network. Accordingly, it is another disadvantage of the prior art system that storage of data is required at the destination nodes.

SUMMARY OF THE INVENTION

It is an object of the present invention to overcome the problems and disadvantages of the prior art method and systems.

It is another objective of the present invention to provide a seamless flow of IP multicast traffic from one terrestrial network to other terrestrial networks via a satellite network.

It is still another objective of the present invention to provide a source to multiple-destination delivery solution of real-time data over satellite based on IP multicast technology while not requiring destination-side storage devices.

It is yet another objective of the present invention to provide a means for non-multicast terrestrial networks to receive multicast traffic by performing multicast to unicast IP address conversion.

It is another objective of the present invention to track and log usage information by clients receiving multicast streams for billing purposes.

To achieve at least the aforementioned objectives, a method of performing IP multicast communication is provided, comprising the steps of (a) at least one client requesting the IP multicast communication from a source via at least one bidirectional communication channel, and (b) transmitting the IP multicast communication generated at the source to at least one destination via a unidirectional communication channel that operates independently of the at least one bidirectional communication channel, wherein the at least one client is positioned in the at least one destination.

Additionally, another method of configuring IP multicast communication is also provided, comprising the steps of (a) requesting the IP multicast communication from a client in one of a plurality of downstream networks to an upstream network via a corresponding bidirectional return channel, (b) encoding a live media stream in the IP multicast communication and transmitting the IP multicast communication generated at the upstream network to the at least one downstream network via a unidirectional satellite that operates independently of the corresponding return channel, the transmission of the live media occurring in real-time without being stored at the destination prior to receipt by the client, and (c) the upstream network receiving a confirmation of receipt of the IP multicast communication from the client via the return channel in response to a confirmation request transmitted from the upstream network to the downstream network. The method further comprises (d) recording a receiving time when the at least one client begins to receive the IP multicast communication, (e) recording a termination time when the at least one client terminates reception of the IP multicast communication, and (f) generating a bill for the IP multicast communication in accordance with the receiving time and the termination time, wherein at least one of steps (d) and (e) is performed at the upstream network via the return channel and the return channel comprises the Internet.

A system for IP multicast communication is also provided to achieve the foregoing objects, comprising a destination that transmits a request via a return channel and receives an IP multicast communication from a unidirectional communication channel, and a source that receives the request through a return channel, and generates and transmits the IP multicast communication to the unidirectional communication channel in accordance with the request, wherein the unidirectional communication channel and the return channel operate independently.

Further, another system for IP multicast communication is provided, comprising a destination transmitting a request and receiving an IP multicast communication from a unidirectional satellite. The destination comprises at least one downstream network having at least one client that generates the request, a reception device that receives and transmits the IP multicast communication from the unidirectional satellite to a router that is configured to communicate via the return channel, and a conversion server coupled to the destination that converts the IP multicast communication to unicast in accordance with conversion information received form the source. A source is also provided that is configured to record usage statistics for a client in the destination and generate a bill in response to the usage statistics, that receives the request through a return channel, and generates and transmits the IP multicast communication to the unidirectional satellite in accordance with the request, the source comprising, a media server configured to output a processed media stream, a media encoder that receives a live media stream and transmits the live media stream to the media server for processing, an upstream network coupled to the media server and receiving the processed media stream and generates the IP multicast communication, a director coupled to the source that receives the conversion information via the return channel, and a router coupled between the upstream network and a transmission device configured to transmit the IP multicast communication to the unidirectional satellite. Additionally, the unidirectional satellite and the return channel operate independently, and the return channel comprises the Internet.

Yet another method of transmitting data between a source and at least one destination is provided, comprising transmitting a request signal from the at least one destination to the source over the Internet, processing one of a live and non-live media stream in the source in accordance with the request signal, generating an IP multicast signal that includes the media stream, and transmitting the IP multicast signal to the at least one destination via an unidirectional communication channel, and through the return channel, transmitting one of usage information from the source to the destination and a usage information request from the destination to the source, and confirming reception of the IP multicast signal by a client in the at least one destination.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification.

The present invention combines unidirectional satellite routing and IP multicast technology to achieve an efficient delivery of real-time data from a source to multiple destinations via a satellite network. The IP multicast transmission can be limited to destinations having clients that request the content. Further, the present invention provides a seamless and dynamic flow of real-time traffic from anywhere in an IP-multicast enabled terrestrial network to other multicast/unicast networks via satellite. Because the preferred embodiment of the present invention enables receipt of non-multicast (i.e., unicast) data through multicast-to-unicast IP address translation at the destination site, such that the multicast traffic is temporarily stored and converted to unicast data from a local server, the present invention can be applied to any type of network. The present invention also allows for real-time delivery of live data from a source to multiple destinations, is capable of working over a hybrid network that includes terrestrial and satellite infrastructure, transparently distributes content over multi-hops networks, and does not require any storage devices at the destination nodes.

Figure 1:
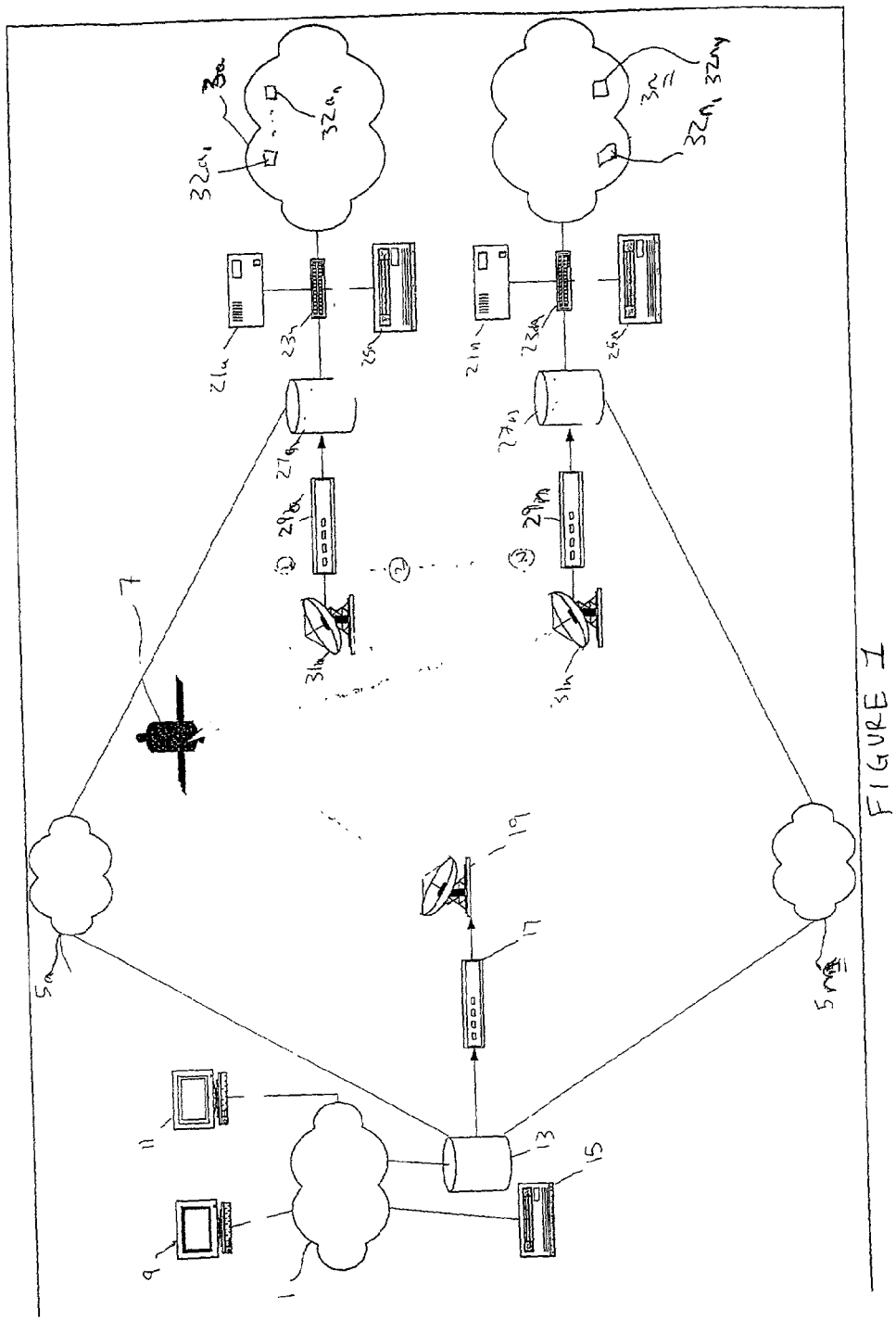
FIG. 1 illustrates a system having IP multicast over a unidirectional satellite with an independent return channel according to the preferred embodiment of the present invention.

FIG. 1 illustrates a system for the preferred embodiment of the present invention. An upstream network 1 generates an IP multicast transmission to a plurality of downstream networks 3a . . . 3n, where each of the downstream networks 3a . . . 3n includes a plurality of clients 32a1 . . . 32an for the first destination, and 32n1 . . . 32ny for the nth destination. The IP multicast transmission is requested by at least one client (e.g., 32a1) located in at least one of the downstream networks 3a . . . 3n, where n represents the total number of downstream networks. The client request is received from the return channel 5a . . . 5m, where m is less than or equal to n. For example but not by way of limitation, a return channel 5a may serve more than one of the downstream networks 3a . . . 3n.

A satellite 7 configured for unidirectional transmission receives the IP multicast from the upstream network 1, and transmits the IP multicast to the downstream networks 3a . . . 3n having clients (e.g., 32a1) that requested the IP multicast transmission.

At the upstream network 1, a media server 11 prepares the media stream, and sends the processed media stream to the upstream network 1. For live media streams to be transmitted via IP multicast in real-time, a media encoder 9 sends the live stream to the media server 11 for preparation for transmission. The IP multicast transmission is routed through a router (e.g., Cisco Router 7206 VXR) 13 that transmits the IP multicast signal to a satellite modem 17, which is coupled to a transmitting satellite dish 19.

The router 13 also communicates with the return channels 5a . . . 5m bidirectionally. For example, while the return channel 5a transmits a request from at least one of the clients (e.g., 32a1) of one of the downstream networks 3a . . . 3n, the router 13 can also transmit a confirmation request via the return channel Sa to the downstream networks 3a . . . 3n, requesting confirmation that the client (e.g., 32a1) received the media stream, or client usage data that can be used for billing purposes, as described in greater detail below. Then, the client (e.g., 32a1) can send the confirmation to the upstream network 1, via the return channel 5a and the router 13.

Where conversion from multicast to unicast is required, a director 15 (e.g., Infolibria) is configured to communicate conversion information with the downstream networks 3a . . . 3n.

As noted above, each of the downstream networks 3a . . . 3n includes at least one client (e.g., 32a1). The downstream network 3a is coupled to a switching device 23a that is coupled to a controller 21a and a server 25a configured for conversion from IP multicast to unicast. The server 25a operates in conjunction with the director 15 at the upstream network 1. A downstream router 27a (e.g., Cisco 7206 VXR) is coupled to the switch, communicates bidirectionally with the return channel 5a, and only receives IP multicast transmission from the satellite 7, via a receiving satellite dish 31a and a satellite modem 29a.

In another preferred embodiment of the present invention, a billing system at the source monitors usage of the system by the clients (e.g., 32a1), and uses the return channel to transmit start and end times for client reception of IP multicast data.

As illustrated in FIG. 1, when a client (e.g., 32a1) on the downstream network 3a requests a live video stream via the Internet, the request is transmitted via the return channel to the media server on the upstream network 1. Upon receiving the request, the server provides the media (e.g., video, audio) data to the client (e.g., 32a1) via the satellite IP multicast link. No dedicated storage device is required at the downstream server 3a (i.e., destination).

If a second client (e.g., 32an) on downstream network-3a requests the same live video, the request is transmitted through the return channel to the server on network 1. However, the second client (e.g., 32an) is served with the same live media stream that is being delivered to the first client (e.g., 32a1). The same procedure applies to any number of clients on the downstream network 3a requesting the same live video stream. Thus, there is a substantial saving of bandwidth, because the media server at the upstream network 1 provides the same data to all requesting clients.

In the preferred embodiment of the present invention, the above scenario can be performed at a plurality of downstream networks. For example, at downstream network 3n, one or more clients can also request the same live stream transmitted via IP multicast to requesting clients at the downstream server 3a. As described above, only a single data stream (e.g., video) is transmitted from the media server at the upstream network 1 to different clients at N various downstream networks 3a . . . 3n. Thus, a single media stream can be selectively served to different requesting clients within a single network or/and other downstream networks using IP multicast technology.

Figure 2:
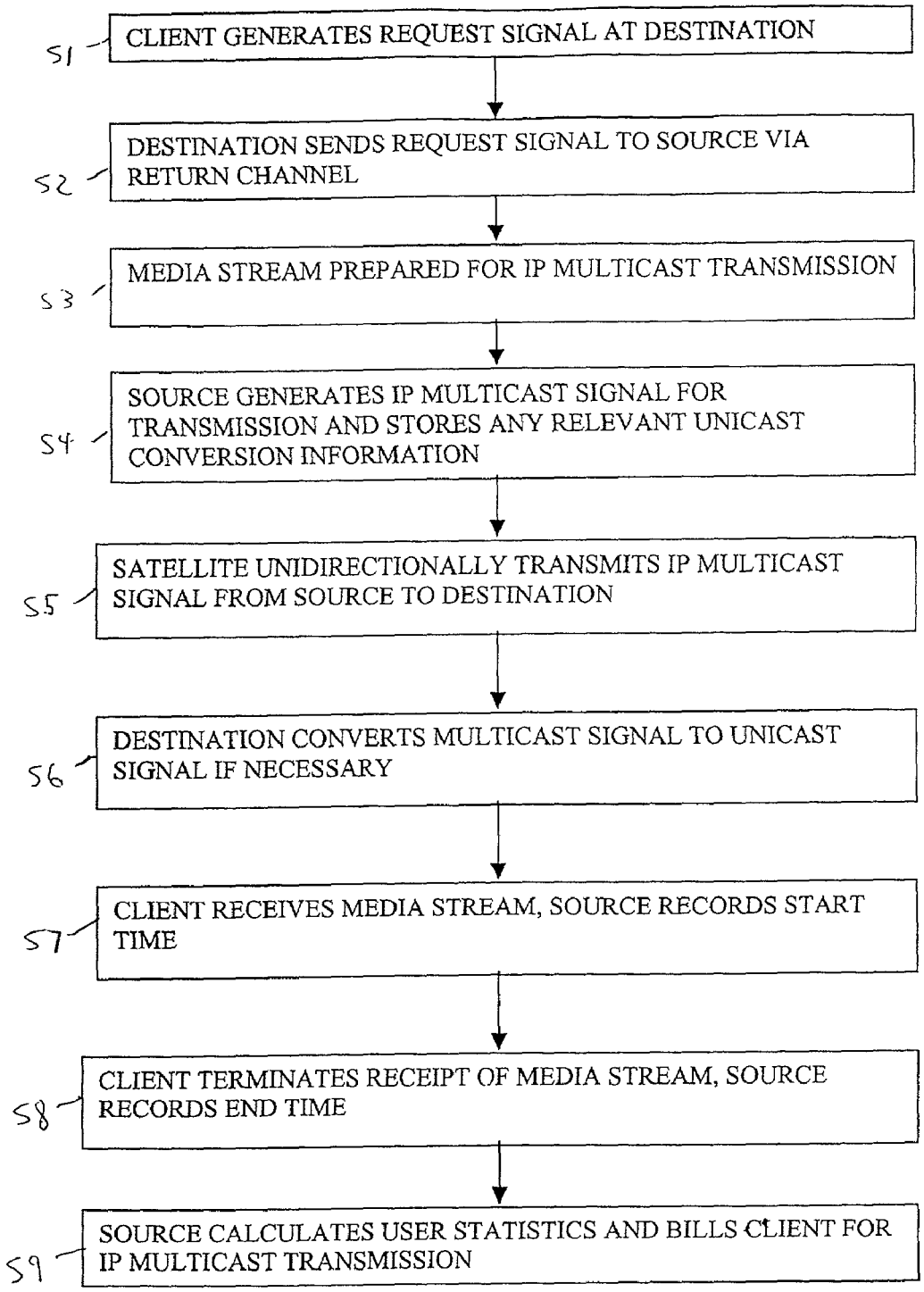
FIG. 2 illustrates a method according to the preferred embodiment of the present invention.

FIG. 2 illustrates a method for the preferred embodiment of the present invention. In a first step S1, a client in a downstream network (i.e., destination) generates a request signal. Then, in a second step S2, the request signal is sent to the upstream network via the return channel. As noted above, the return channel can handle up to all of the destinations.

Next, in a third step S3, the media stream is processed. At the upstream network, the request is received at a router, and the director is configured to identify the downstream network of the client, and whether that network requires conversion from multicast to unicast. Additionally, the media server prepares the media stream for transmission. If the media stream is a live media stream according to one of the embodiments of the present invention, the media encoder, encodes the live feed, which is transmitted to the media server via the upstream network, and the media server prepares the live media stream for multicast transmission.

In a fourth step S4, the upstream network generates the IP multicast signal, and for a unicast downstream network, the director is configured to pre-configure for conversion at the local downstream network, to optimize scheduling capacity. Next, in a fifth step S5, a satellite capable of unidirectional transmission receives the IP multicast signal, and transmits that IP multicast signal to the downstream network that includes the requesting client. In a sixth step S6, the downstream network converts the IP multicast into unicast if the downstream network is not configured for IP multicast transmission. The conversion process can occur in, for example but not by way of limitation, a server coupled to a switch prior to transmission to the downstream network, as illustrated in FIG. 1 and discussed in greater detail above.

In a seventh step S7, the client receives that requested data, and the time at which the client begins to receive the requested data is recorded and transmitted to the upstream network through the return channel. The client continues to receive the requested data until the client terminates the receiving process in an eighth step S8, and the time at which the transmission is terminated is recorded and transmitted to the upstream network through the return channel. Thus, usage statistics for the client are recorded at the upstream network (i.e., source).

In a ninth step S9, the client is billed by the source for time spent receiving the IP multicast transmission. The client can be billed by the source in real-time for a unidirectional satellite-based IP multicast transmission, where the upstream network can compute the bill by using the return channel.

During the above-described method, the upstream network can request a confirmation of receipt from the client, through the return channel. Once the client receives the request for confirmation, the client acknowledges confirmation through the return channel, such that bidirectional communication is performed at the return channel and unidirectional communication is performed for IP multicast at the satellite.

The present invention has various advantages. For example but not by way of limitation, because unidirectional routing is implemented, there is no need for request signal transmission via satellite at the destination nodes, and selective IP multicasting can be performed such that non-requesting destinations do not receive the IP multicast communication. Further, implementing unidirectional routing does not require a transponder in the satellite, because the return channel is not on the satellite. Thus, the cost of the satellite is further reduced, and the Internet provides a cheaper method of transmitting a return signal than the prior art bidirectional satellite.

Further, it is also a benefit of the present invention in that if there is no client listening to a specific stream, then the stream can be turned off for a given destination. Hence, satellite bandwidth is saved, which is not possible for the aforementioned prior art system.

The present invention solves the problems associated with the prior art RPF method, and allows "live" multicast data to be distributed over a unidirectional satellite link from a source to multiple destinations in real-time with a substantial bandwidth savings. The client can request the multicast data using the return channel, which can include, but is not limited to, communication via one of a plurality of routing paths on the Internet. Further, the source to destination links can be asymmetrical and optimizes bandwidth efficiency.

Because the unique configuration of the present system is transparent to the rest of the network, the preferred embodiment of the present invention can be applied to a multi-hop network on both sides of the satellite link.

As noted above, the present invention uses unidirectional routing, so that at destination nodes, IP multicast information can be routed to the source via terrestrial links (e.g., Internet). More specifically, the present invention uses the concept of "true" IP multicast, such that a receiver only receives multicast data if it has requested multicast data. As a result, it is an advantage of the present invention that additional bandwidth savings occur.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method of performing IP multicast communication, comprising the steps of:
   (a) at least one client requesting the IP multicast communication from a source via at least one bidirectional communication channel;
   (b) transmitting the IP multicast communication generated at the source to at least one destination via a unidirectional communication channel that operates independently of the at least one bidirectional communication channel, wherein the at least one client is positioned in the at least one destination, and
   (c) converting the IP multicast communication to unicast at the at least one destination in accordance with destination information stored at the source based on data transmitted on the at least one bidirectional communication channel.

2. The method of claim 1, further comprising the source receiving a confirmation from the at least one destination via the at least one bidirectional communication channel in response to a confirmation request transmitted from the source to the at least one destination.

3. The method of claim 1, further comprising:
   (a) recording a receiving time indicative of the at least one client starting to receive the IP multicast communication;
   (b) recording a termination time indicative of the at least one client terminating reception of the IP multicast communication; and
   (c) calculating client user statistics and generating a bill for the IP multicast communication in accordance with said client user statistics, wherein at least one of steps (a) and (b) is performed at the source.

4. The method of claim 1, further comprising encoding a live media stream for real-time transmission to the at least one client in step (b).

5. The method of claim 1, wherein step (a) comprises using a number of the at least one bidirectional communication channel that is less than or equal to a number of the at least one destination.

6. The method of claim 5, further comprising using the Internet as at least one bidirectional communication channel.

7. The method of claim 1, the step (b) comprising transmitting the IP multicast communication from a transmitting satellite dish at the source to a to a receiving satellite dish at the at least one destination through a unidirectional satellite.

8. The method of claim 1, further comprising configuring a router in a transparent manner with respect to a network for application to multi-hop networks positioned in at least one of said source and the at least one destination.

9. The method of claim 1, further comprising turning off a stream if there is no client listening to said stream from the at least one destination.

10. A system for IP multicast communication, comprising:
    a destination that transmits a request via a return channel and receives an IP multicast communication from a unidirectional communication channel;
    a source that receives the request through the return channel, and generates and transmits the IP multicast communication to the unidirectional communication channel in accordance with the request, wherein the unidirectional communication channel and the return channel operate independently;
    a director coupled to the source that receives conversion information via the return channel; and
    a conversion server coupled to the destination that converts the IP multicast communication to unicast in accordance with the conversion information and without requiring a routing table.

11. The system of claim 10, wherein the unidirectional communication channel comprises a satellite.

12. The system of claim 10, the destination comprising:
    at least one downstream network having a client that generates the request; and
    a reception device that receives and transmits the IP multicast communication from the unidirectional communication channel to a router that communicates via the return channel.

13. The system of claim 10, wherein the return channel comprises the Internet.

14. The system of claim 10, wherein the source is configured to record usage statistics for requesting a client at the destination, and generates a bill in response to the usage statistics.

15. The system of claim 10, the source comprising:
    a media server that prepares a media stream; and
    an upstream network that is coupled to the media server and receives the media stream and generates the IP multicast communication.

16. The system of claim 15, the source further comprising a media encoder that receives a live media stream and transmits the live media stream to the media server for real-time transmission to a client at the destination.

17. The system of claim 15, further comprising:
a router coupled between the upstream network; and
a transmission device, wherein said transmission device transmits the IP multicast communication to the unidirectional communication channel without delay.

18. The method of claim 10, further comprising a router configured transparently with respect to a network for application to multi-hop networks, located in at least one of said source and said destination.

19. A system for IP multicast communication, comprising:
a destination transmitting a request and receiving an IP multicast communication from a unidirectional satellite, the destination comprising,
   at least one downstream network having at least one client that generates the request,
   a reception device that receives and transmits the IP multicast communication from the unidirectional satellite to a router that is configured to communicate via a return channel, and
   a conversion server coupled to the destination that converts the IP multicast communication to unicast in accordance with conversion information;
a source, configured to send said information to said server and to record usage statistics for a client in the destination and generate a bill in response to the usage statistics, that receives the request through the return channel, and generates and transmits the IP multicast communication to the unidirectional satellite in accordance with the request, the source comprising,
   a media server configured to output a processed media stream,
   a media encoder that receives a live media stream and transmits the live media stream to the media server for processing,
   an upstream network coupled to the media server that receives the processed media stream and generates the IP multicast communication,
   a director coupled to the source that receives the conversion information via the return channel, and
   a router coupled between the upstream network and a transmission device configured to transmit the IP multicast communication to the unidirectional satellite;
wherein the unidirectional satellite and the return channel operate independently, and the return channel comprises the Internet.

* * * * *